United States Patent
Kozaki

(10) Patent No.: US 10,950,001 B2
(45) Date of Patent: Mar. 16, 2021

(54) DETERMINATION PROGRAM, DETERMINATION METHOD, AND INFORMATION PROCESSING APPARATUS

(71) Applicant: FUJITSU LIMITED, Kawasaki (JP)

(72) Inventor: Takuya Kozaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 16/364,148

(22) Filed: Mar. 25, 2019

(65) Prior Publication Data

US 2019/0318504 A1    Oct. 17, 2019

(30) Foreign Application Priority Data

Apr. 12, 2018    (JP) .............................. JP2018-076851

(51) Int. Cl.
*G06T 7/73*       (2017.01)
*G06T 15/20*    (2011.01)
*G06T 19/20*    (2011.01)

(52) U.S. Cl.
CPC ................ *G06T 7/75* (2017.01); *G06T 15/20* (2013.01); *G06T 19/20* (2013.01)

(58) Field of Classification Search
CPC .. G06T 7/75; G06T 15/20; G06T 7/73; G06T 19/20; G06T 19/006
USPC ....................................................... 382/103
See application file for complete search history.

(56) References Cited

U.S. PATENT DOCUMENTS

| | | | |
|---|---|---|---|
| 2005/0090742 A1* | 4/2005 | Mine ...................... | A61B 34/20 600/443 |
| 2007/0018975 A1* | 1/2007 | Chuanggui ............ | A61B 90/36 345/419 |
| 2010/0027888 A1* | 2/2010 | Katano ................. | G06T 19/006 382/173 |
| 2012/0002841 A1* | 1/2012 | Aratani ................. | G06T 7/0065 382/103 |

(Continued)

FOREIGN PATENT DOCUMENTS

EP       3300025 A1     3/2018
JP       2014-26670     2/2014

OTHER PUBLICATIONS

P. Pejic et al., "Augmented Reality Application in Engineering", SMAT 2014, 3rd International congress, pp. 39-44, Sep. 28, 2014 Cited in Extended European Search Report (EESR) dated Nov. 13, 2019 for corresponding European Patent Application No. 19164020.0.

(Continued)

*Primary Examiner* — Congvan Tran
(74) *Attorney, Agent, or Firm* — Fujitsu Patent Center

(57) ABSTRACT

A computer acquires a captured image obtained by capturing an image of an object existing in a space and an image capturing position where the image was captured. Then, the computer determines a virtual-image capturing position, a virtually captured image, obtained when an image of a model generated based on structure data of the object is captured from the virtual-image capturing position, satisfying a specified correspondence relationship with the captured image having been obtained; and determines a position in the space with which the model is associated, based on the acquired image capturing position and positional relationship between the model and the virtual-image capturing position.

9 Claims, 11 Drawing Sheets

(56) References Cited

U.S. PATENT DOCUMENTS

| | | | | |
|---|---|---|---|---|
| 2012/0307001 | A1* | 12/2012 | Osako | A63F 13/5255 |
| | | | | 348/36 |
| 2013/0162637 | A1* | 6/2013 | Son | G03H 1/2294 |
| | | | | 345/419 |
| 2015/0363935 | A1* | 12/2015 | Motoyoshi | G06T 1/0014 |
| | | | | 382/103 |
| 2017/0004653 | A1* | 1/2017 | Takemoto | G06T 17/05 |
| 2017/0352188 | A1* | 12/2017 | Levitt | G06F 1/1626 |

OTHER PUBLICATIONS

Extended European Search Report (EESR) of European Patent Application No. 19164020.0 dated Nov. 13, 2019.

\* cited by examiner

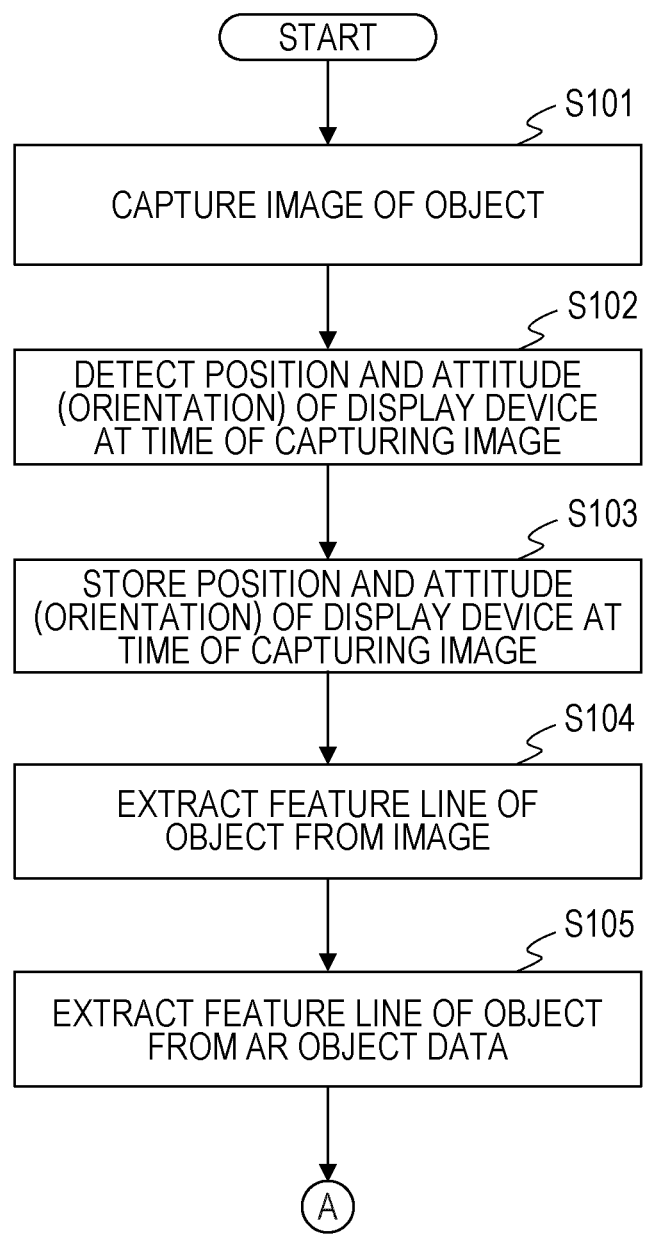

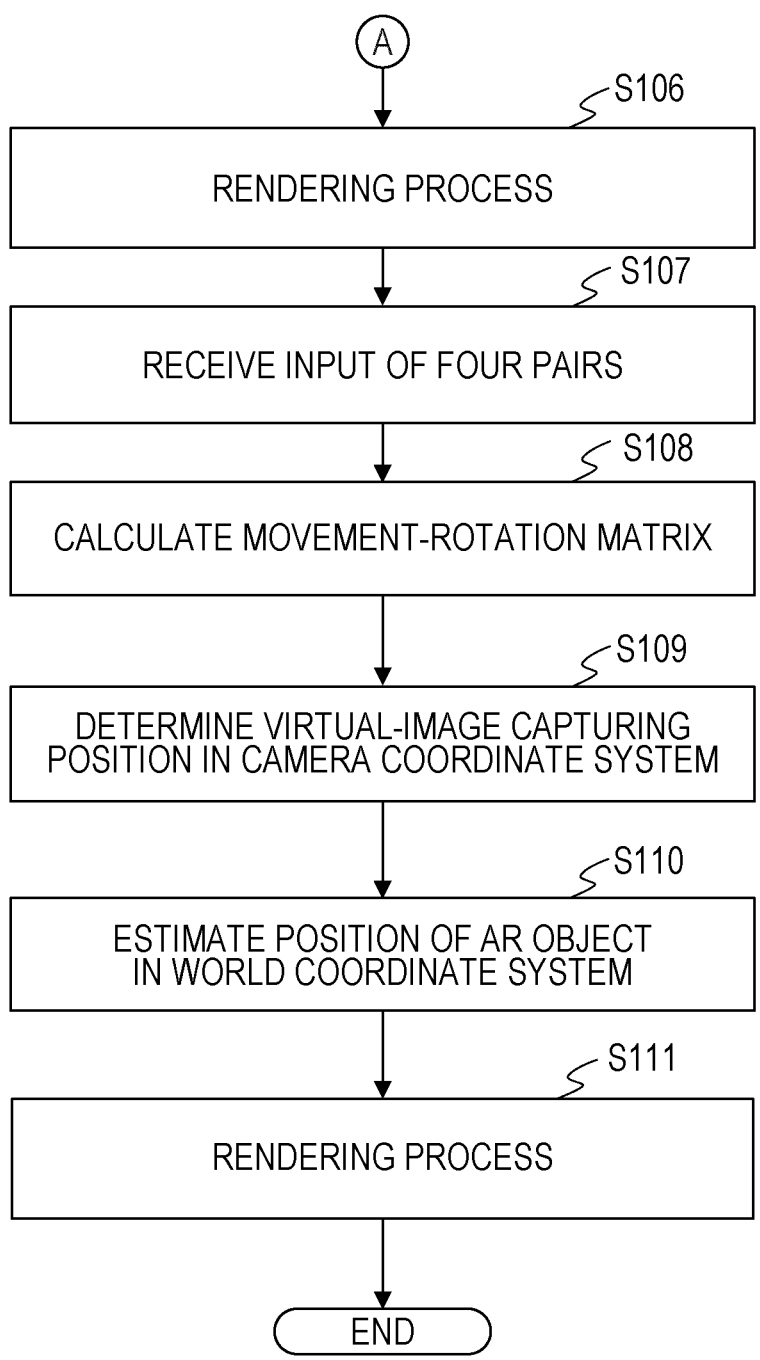

DETERMINATION PROGRAM, DETERMINATION METHOD, AND INFORMATION PROCESSING APPARATUS

CROSS-REFERENCE TO RELATED APPLICATION

This application is based upon and claims the benefit of priority of the prior Japanese Patent Application No. 2018-76851, filed on Apr. 12, 2018, the entire contents of which are incorporated herein by reference.

FIELD

The embodiment discussed herein is related to determination programs, determination methods, and information processing apparatuses.

BACKGROUND

Recent years, systems that display images using augmented reality (AR) technology have been widely used. In some cases, mixed reality (MR) technology is used along with AR technology. A system using AR technology and MR technology (AR/MR technology) is capable of, for example, displaying an image of the real world obtained by capturing an image of an object using a camera mounted on a smartphone or the like and computer graphic (CG) data at the same time. Accordingly, the user is able to see AR/VR images or videos in which the real world and CG data are displayed at the same time through a smartphone or the monitor of a head mounted display (HMD).

As related technologies, information processing apparatuses have been proposed which hold three-dimensional model data including multiple line segments constituting an object, acquire an image of the object captured by an image capturing apparatus, and detect from the acquired image the line segments corresponding to the line segments included in the three-dimensional model data. The information processing apparatuses perform a position-attitude calculation process, based on the correspondence between the detected line segments and the held line segments, and calculate information on the position and attitude of the image capturing apparatus with respect to the object the image of which is captured by the image capturing apparatus (for example, see Japanese Laid-open Patent Publication No. 2014-26670).

The use of AR/MR technology also makes it possible to display near an object a model generated using design data used during the design of the object. However, in comparing the object and the model, it may be easier to notice the difference between the object and the model when the object and the model are displayed being superposed with each other than when they are displayed side by side. In this case, when the user looks for the difference between the object and the model, it is preferable that the positions of the object and the model be associated accurately when they are displayed. However, it is difficult to associate the position of the object and the display position of the model with each other accurately.

SUMMARY

The present embodiment associates the position of the object and the position of the model with each other accurately.

According to an aspect of the embodiments, an apparatus acquires a captured image obtained by capturing an image of an object existing in a space and an image capturing position where the image was captured. Then, the apparatus determines a virtual-image capturing position, a virtually captured image, obtained when an image of a model generated based on structure data of the object is captured from the virtual-image capturing position, satisfying a specified correspondence relationship with the captured image having been obtained; and determines a position in the space with which the model is associated, based on the acquired image capturing position and positional relationship between the model and the virtual-image capturing position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a flowchart for explaining an example of a process of estimating the setup position of the model in the display device according to this embodiment;

FIG. 4B is a flowchart for explaining the example of the process of estimating the setup position of the model in the display device according to this embodiment;

DESCRIPTION OF EMBODIMENTS

To look for the difference between an object and a model, it is preferable that a display device, such as a smartphone or an HMD, adjust the position of the model to display it so that the model and the object are superposed with each other accurately at the same position.

Hereinafter, the embodiment is described in detail with reference to the drawings.

Figure 1:
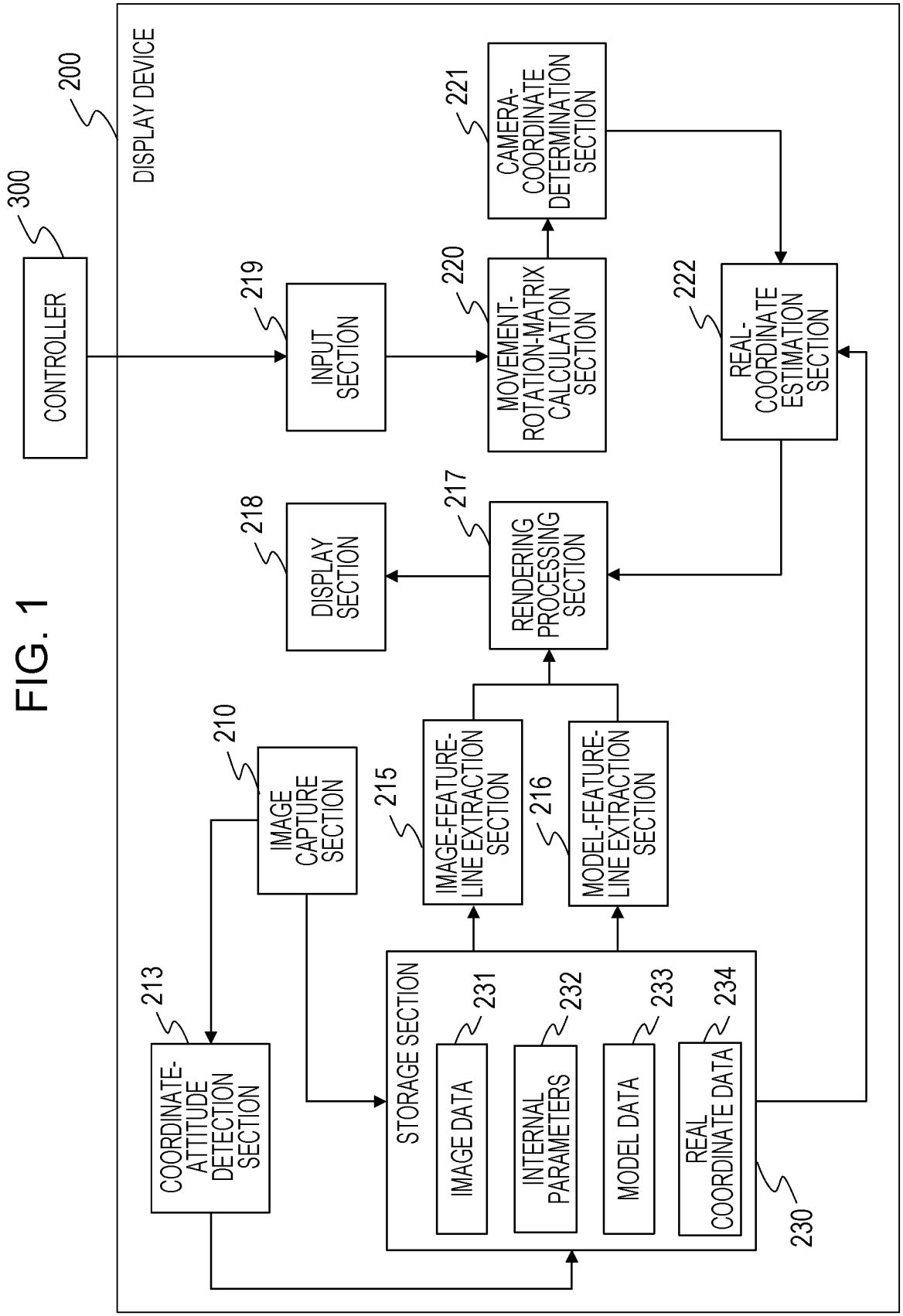
FIG. 1 is a block diagram for explaining an example of a process of estimating a setup position of a model in a display device according to this embodiment.

FIG. 1 is a block diagram for explaining an example of a process of estimating a setup position of a model in a display device according to this embodiment. The display device 200 includes an image capture section 210, storage section 230, coordinate-attitude detection section 213, image-feature-line extraction section 215, model-feature-line extraction section 216, rendering processing section 217, display section 218, input section 219, movement-rotation-matrix calculation section 220, camera-coordinate determination section 221, and real-coordinate estimation section 222.

The storage section 230 stores model data 233 (an AR object, structure data) of a model, created in advance to make an object. In the process of estimating the setup position of the model, first, the image capture section 210 captures an image of the object. The image data 231 of the captured image obtained by capturing the image is sent to the storage section 230. The storage section 230 stores the image data 231 obtained by capturing the image and internal parameters 232, which are the image capturing condition. The coordinate-attitude detection section 213 detects the position coordinates and orientation of the display device 200 itself in the world coordinate system at the time when the display device 200 captured the image of the object. The storage section 230 stores the position coordinates and orientation of the display device 200 itself in the world coordinate system at the time when the display device 200 captured the image of the object, as real coordinate data 234.

The image-feature-line extraction section 215 reads the image data 231 from the storage section 230 and extracts a feature line in the object in the captured image. Here, the feature line is a line segment used for associating the position of the object and the position of the model with each other, examples of which include an outline of the object and a line indicating a characteristic shape in the object. The model-feature-line extraction section 216 reads the model data 233 from the storage section 230 and extracts a feature line in the AR object.

After the image-feature-line extraction section 215 and the model-feature-line extraction section 216 extract the feature lines, the rendering processing section 217 renders the feature lines extracted from the captured image and the AR object. The display section 218 displays on a monitor the captured image, the AR object, and the feature lines extracted from them, which are rendered by the rendering processing section 217.

The input section 219 receives information obtained through operation of a controller 300, on the pair of the feature line extracted from the captured image and the feature line extracted from the AR object. Here, the user specifies as a pair the feature lines that become the same line when superposing the AR object and the object captured in the captured image with each other.

The movement-rotation-matrix calculation section 220 calculates a movement-rotation matrix from information inputted from the input section 219. Note that the movement-rotation matrix is described later with reference to FIG. 2B.

The camera-coordinate determination section 221 determines the positional relationship in which the captured image and the AR object viewed from the image capturing position in the virtual world agree with each other. Hereinafter, the image capturing position in the virtual world is referred to as "the virtual-image capturing position", and the captured image in the virtual world is referred to as "the virtually captured image". The camera-coordinate determination section 221 may change the coordinates of the virtual camera (the virtual-image capturing position) with the position of the AR object fixed, to form the positional relationship in which the virtually captured image and the AR object viewed from the virtual-image capturing position agree with each other. Alternatively, the camera-coordinate determination section 221 may change the coordinates of the AR object with the virtual camera fixed to form the positional relationship in which the virtually captured image and the AR object viewed from the virtual-image capturing position agree with each other. Note that the positional relationship between the virtually captured image and the AR object viewed from the virtual-image capturing position only has to be positional relationship the degree of agreement of which satisfies criteria.

From the determined positional relationship between the virtual-image capturing position and the coordinates of the AR object and the position coordinates and orientation of the display device 200 stored in the storage section 230, the real-coordinate estimation section 222 estimates the position where to display the AR object in the real coordinates (the world coordinate system). For example, the real-coordinate estimation section 222 sets the position of the AR object such that the determined positional relationship between the virtual-image capturing position and the AR object agrees with the positional relationship between the object and the camera at the time when the image of the object was really captured. After the real-coordinate estimation section 222 estimates the position where to display the AR object in the real coordinates (the world coordinate system), the rendering processing section 217 displays the AR object on the display section 218. This allows the user to see the AR object superposed on the object through the display section 218. For example, the real-coordinate estimation section 222 determines the estimated position where to display the AR object in the real coordinates (the world coordinate system).

FIGS. 2A to 2E are diagrams for explaining an example of a process of estimating the setup position of a model, according to this embodiment. The process of estimating the setup position of the model is executed by the display device 200 in the order of FIG. 2A to FIG. 2E.

Figure 2A:
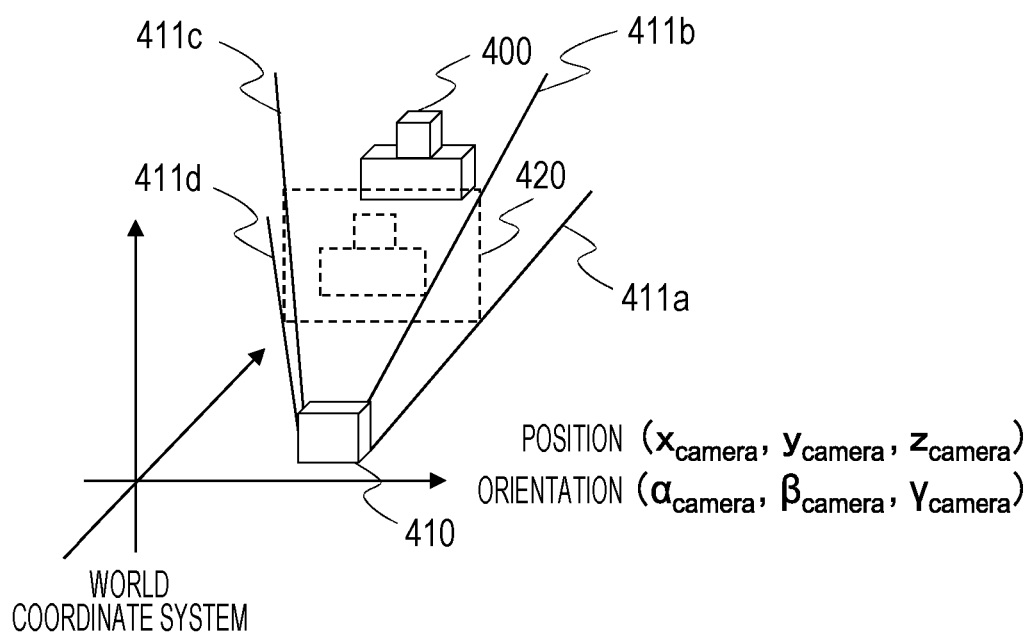
FIG. 2A is a diagram for explaining an example of a process of estimating the setup position of the model, according to this embodiment.

FIG. 2A is a diagram illustrating an example in which the image capture section 210 mounted on the display device 200 captured an image of an object 400. The image capture section 210 is implemented by, for example, a camera 410. When an image of the object 400 is captured, the coordinate-attitude detection section 213 detects the position coordinates ($x_{camera}$, $y_{camera}$, $z_{camera}$) and orientation ($\alpha_{camera}$, $\beta_{camera}$, $\gamma_{camera}$) of the display device 200 itself in the world coordinate system at the time of capturing the image of the object 400. The storage section 230 stores the position coordinates ($x_{camera}$, $y_{camera}$, $z_{camera}$) and orientation ($\alpha_{camera}$, $\beta_{camera}$, $\gamma_{camera}$) of the display device 200 itself. Note that at the time of FIG. 2A, the display device 200 has not grasped the position of the object 400.

In addition, the image capturing condition of the camera 410 at the time of capturing the object 400 is also stored in the storage section 230. In the following description, the image capturing condition of the camera 410 at the time of capturing the object 400 may be also referred to as "the internal parameters". Examples of the internal parameters include the angles of view 411a to 411d, the resolution, and the focal length. The angles of view 411a to 411d are the angles that specify the range actually caught on the screen of the camera 410. The focal length is the focal length at the time of capturing an image with the focus of the camera 410 adjusted on the object 400. Here, it is assumed in FIG. 2A that a captured image 420 having a size within the angles of view 411a to 411d is located at a position away from the camera 410 by the focal length.

Figure 2B:
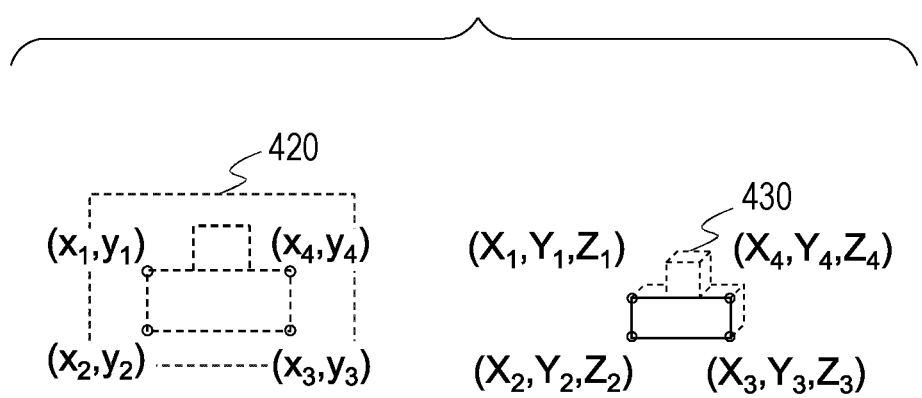
FIG. 2B is a diagram for explaining the example of the process of estimating the setup position of the model, according to this embodiment.

FIG. 2B is an example of a screen displayed on the display section 218 after the image of the object 400 is captured in FIG. 2A. In the example of FIG. 2B, the display section 218 displays the captured image 420 and an AR object 430.

In this embodiment, the user operates the controller 300 to specify a feature line in the captured image that agrees with a feature line indicating a feature of the object. In addition, the user specifies the feature line in the AR object corresponding to the specified feature line in the captured image. In this case, the feature line of the object appearing in the captured image and the feature line of the AR object correspond to a line indicating the same feature of the object. Hereinafter, specifying a feature line of the object appearing on the captured image, associating it with the feature line of the AR object indicating the same feature as the specified feature line indicates, and making a pair as described above is called "pairing". To adjust the captured image and the display position of the AR object, the user specifies one or more pairs of feature lines. Then, the display position is determined as described later such that the display positions of the feature lines included in each specified pair agree with each other. As an example, the user specifies pairs of feature lines of the object appearing in the object image and feature lines of the AR object, the pairs corresponding to four feature lines of the object.

In the example of FIG. 2B, in order to make the display positions of the feature lines in agreement, the display section 218 displays the feature lines extracted by the image-feature-line extraction section 215, superposing them on the captured image 420. The display section 218 also displays the feature lines extracted by the model-feature-line extraction section 216, superposing them on the AR object 430.

The user checks the display section 218, makes pairs of feature lines extracted from the captured image and feature lines extracted from the AR object, and inputs the pairing information into the controller 300. The pairing information is received by the input section 219. Although four pairs are specified in the example in FIG. 2B, the number of feature lines to be paired may be any number. In the example of FIG. 2B, it is assumed that the following pairs have been specified.

The pair of the feature line of $(x_1, y_1)$ to $(x_2, y_2)$ in the captured image and the feature line of $(X_1, Y_1, Z_1)$ to $(X_2, Y_2, Z_2)$ in the AR object The pair of the feature line of $(x_2, y_2)$ to $(x_3, y_3)$ in the captured image and the feature line of $(X_2, Y_2, Z_2)$ to $(X_3, Y_3, Z_3)$ in the AR object The pair of the feature line of $(x_3, y_3)$ to $(x_4, y_4)$ in the captured image and the feature line of $(X_3, Y_3, Z_3)$ to $(X_4, Y_4, Z_4)$ in the AR object The pair of the feature line of $(x_4, y_4)$ to $(x_1, y_1)$ in the captured image and the feature line of $(X_4, Y_4, Z_4)$ to $(X_1, Y_1, Z_1)$ in the AR object The movement-rotation-matrix calculation section 220 calculates a movement-rotation matrix from the specified pairs of feature lines. The movement-rotation matrix is a matrix used when point coordinates of an object in the virtually captured image and three-dimensional coordinates of the object are converted into each other. For example, the movement-rotation-matrix calculation section 220 uses a Perspective-n-Line (PnL) method on the four pairs to calculate a movement-rotation matrix. Note that the number of pairs of feature lines used for calculation of the movement-rotation matrix using the PnL method may be changed to any number.

Figure 2C:
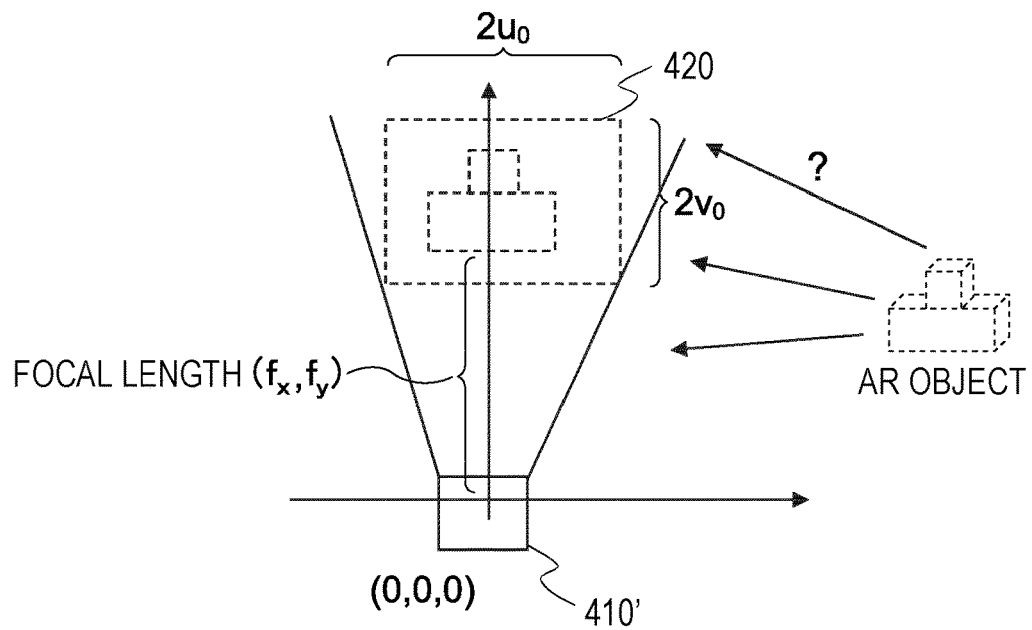
FIG. 2C is a diagram for explaining the example of the process of estimating the setup position of the model, according to this embodiment.
Figure 2D:
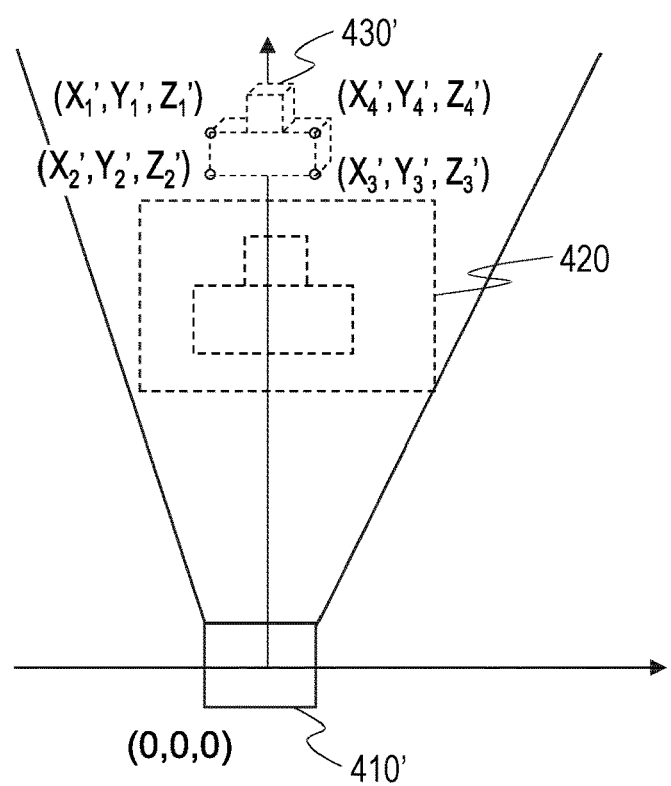
FIG. 2D is a diagram for explaining the example of the process of estimating the setup position of the model, according to this embodiment.

FIGS. 2C and 2D are diagrams illustrating a process performed by the camera-coordinate determination section 221 to determine the coordinates of the image capturing position, captured image 420, and AR object in the virtual world, to make it easy to understand the process. FIG. 2C illustrates, as an example, the positional relationship between a virtual camera 410' and the captured image 420 in a camera coordinate system in the virtual world. Here, it is assumed that the virtual-image capturing position of the virtual camera 410' is set at position (0, 0, 0) in the camera coordinate system.

The storage section 230 sets the positional relationship between the virtual camera 410' and the captured image 420, using the internal parameters 232 used at the time when the camera 410 captured the image of the object 400. For example, assume that the following internal parameters 232 are stored.

$f_x$: the focal length of the camera in the x direction
$f_y$: the focal length of the camera in the y direction
$u_0$: the coordinate in the x direction of the center point of the captured image 420
$v_0$: the coordinate in the y direction of the center point of the captured image 420

The camera-coordinate determination section 221 refers to the focal length in the internal parameters 232 to set the captured image 420 at a position away from the virtual-image capturing position (the position of the virtual camera 410') by the focal length $(f_x, f_y)$. The camera-coordinate determination section 221 also refers to the resolution in the internal parameters 232 to set the captured image 420 as an image having a width of $2u_0$ and a height $2v_0$.

After the virtual camera 410' and the captured image 420 are set as illustrated in FIG. 2C, the camera-coordinate determination section 221 sets up the AR object 430' at the position calculated using Math. 1.

$$\begin{pmatrix} u \\ v \\ 1 \end{pmatrix} \sim \begin{pmatrix} f_x & 0 & u_0 \\ 0 & f_y & v_0 \\ 0 & 0 & 1 \end{pmatrix} \begin{pmatrix} r_{11} & r_{12} & r_{13} & t_x \\ r_{21} & r_{22} & r_{23} & t_y \\ r_{31} & r_{32} & r_{33} & t_z \end{pmatrix} \begin{pmatrix} x \\ y \\ z \\ 1 \end{pmatrix} \quad \text{[Math. 1]}$$

Math. 1 is an example of a model formula for a pinhole camera model. The symbol u in the matrix on the left side of Math. 1 represents the value of the x coordinate of a point on the image plane. The symbol v in the matrix on the left side of Math. 1 represents the value of the y coordinate of the point on the image plane. As an example, assigned to u and v are the point coordinates of the captured image 420 $(x_1, y_1), (x_2, y_2), (x_3, y_3), (x_4, y_4)$, or the like.

On the right side of Math. 1 are, in order from the left, the internal parameters, the movement-rotation matrix, and the matrix including three-dimensional coordinates. The symbol $f_x$ in the internal parameters is a value indicating the focal length in the x direction in pixel units; the symbol $f_y$ is a value indicating the focal length in the y direction in pixel units. The symbols $u_0$ and $v_0$ in the internal parameters are the coordinates of the center point of the captured image 420. The movement-rotation matrix on the right side of Math. 1 is calculated from the pairs of feature lines in the movement-rotation-matrix calculation section 220. The symbols x, y, and z in the matrix including three-dimensional coordinates on the right side of Math. 1 are the values of the three-dimensional coordinates of the AR object 430'.

As an example, by assigning point coordinates $(x_1, y_1)$ of the captured image 420 to u and v in Math. 1, the camera-coordinate determination section 221 is able to calculate $(X_1', Y_1', Z_1')$ as the position of the AR object 430' in the camera coordinates, corresponding to the assigned coordinates (FIG. 2D). In the same way, the camera-coordinate determination section 221 may substitute coordinates $(X_1, Y_1, Z_1)$ of the AR object 430 in the camera coordinates into Math. 1. In this case, the camera-coordinate determination section 221 is able to calculate that the position corresponding to coordinates $(X_1, Y_1, Z_1)$ in the AR object 430 corresponds to the position displayed at point coordinates $(x_1', y_1')$ in the captured image 420.

By performing such calculation, the camera-coordinate determination section 221 determines the positional relationship in which the captured image 420 and the AR object 430' viewed from the image capturing position in the virtual world (the position of the virtual camera) agree with each other as illustrated in FIG. 2D.

Figure 2E:
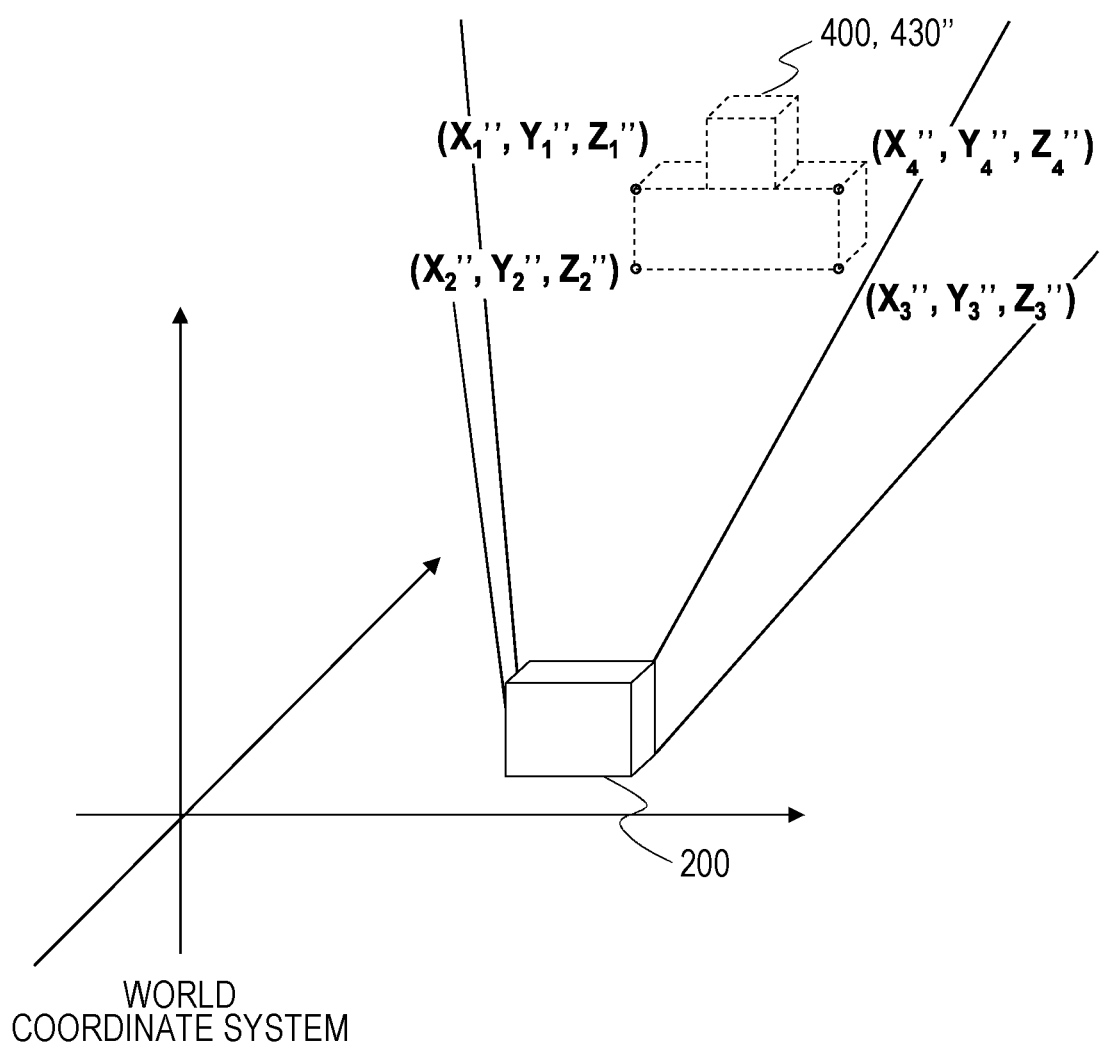
FIG. 2E is a diagram for explaining the example of the process of estimating the setup position of the model, according to this embodiment.

In FIG. 2E, from the determined positional relationship between the virtual-image capturing position and the coordinates of the AR object and the position coordinates and orientation of the display device 200 stored in the storage section 230, the real-coordinate estimation section 222 estimates the position where to display the AR object in the real coordinates (the world coordinate system). For example, the real-coordinate estimation section 222 sets the position of the AR object such that the determined positional relationship between the virtual-image capturing position and the AR object agrees with the positional relationship between the object and the camera at the time when the image of the object was really captured. After the real-coordinate estimation section 222 estimates the position where to display the AR object in the real coordinates (the world coordinate system), the rendering processing section 217 displays the AR object on the display section 218. This allows the user to see the AR object superposed on the object through the display section 218.

As above, the display device 200 according to this embodiment determines the image capturing position for a model generated based on the structure data of an object such that the captured image obtained when the image of the model is captured by the virtual camera satisfies a specified correspondence relationship with the acquired captured image. The specified correspondence relationship is the positional relationship in which the captured image 420 and the AR object 430' viewed from the image capturing position in the virtual world (the position of the virtual camera) determined by the camera-coordinate determination section 221 agree with each other. After that, based on the acquired image capturing position and the determined positional relationship between the model and the image capturing position in the virtual world, the display device 200 estimates the position of the model in the space. Thus, by using this embodiment, the display device 200 is able to display the object and the model superposed with each other accurately. Since the display device 200 is able to measure its own position coordinates, orientation, and the like; when the user views the model from a different position or at a different angle, the display device 200 is able to display the object and the model without any difference in their positions. The description is provided below with reference to FIG. 3.

Figure 3:
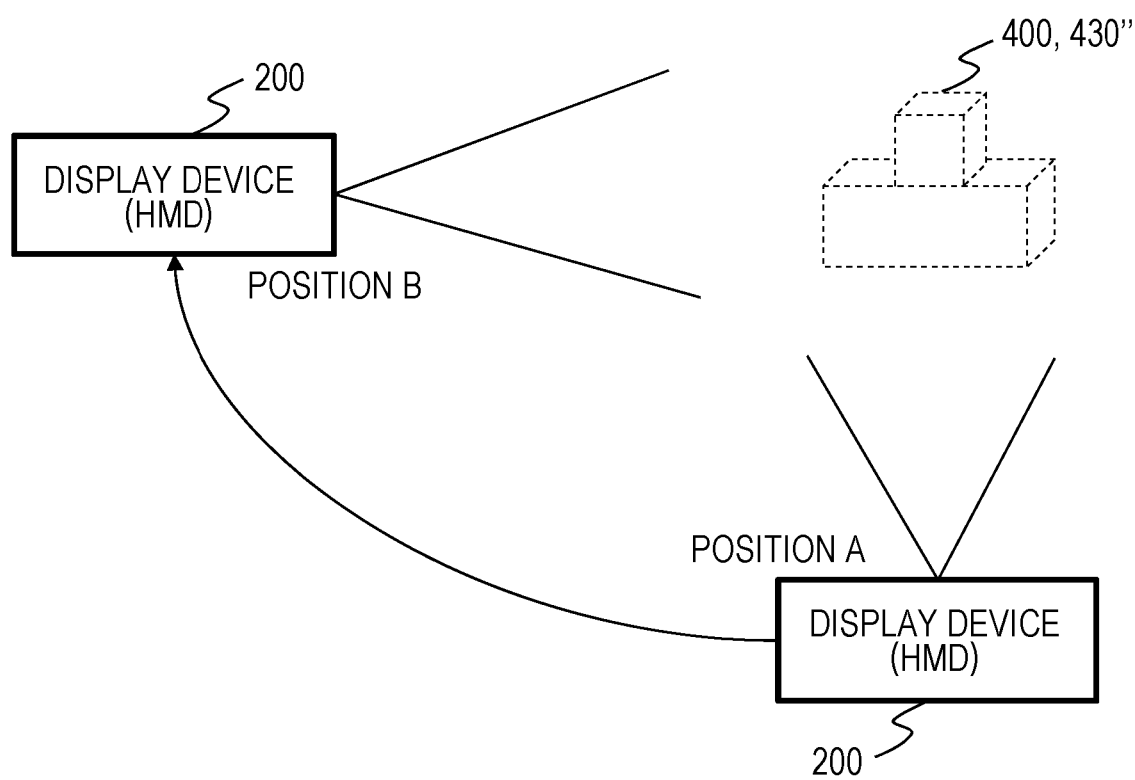
FIG. 3 is a diagram for explaining an example in which the model and an object are viewed using the display device according to this embodiment.

FIG. 3 is a diagram for explaining an example in which the model and the object are viewed using the display device according to this embodiment. FIG. 3 illustrates an example in which the setup position of an AR object 430" is estimated through the processes illustrated in FIG. 2A to FIG. 2E when the display device 200 is located at position A. Since a three-dimensional model (the AR object 430") is displayed being superposed on the object 400, the superposed AR object 430" is displayed at all the positions on the object 400. Accordingly, the user is able to see the AR object 430" through the display device 200 at the same position and in the same attitude (orientation) as those of the object 400.

In this embodiment, the display device 200 displays the AR object 430" superposed on the object 400 at all the positions on the object 400. The display device 200 is an apparatus capable of detecting the position coordinates $(x_{camera}, y_{camera}, z_{camera})$ and orientation $(\alpha_{camera}, \beta_{camera}, \gamma_{camera})$ of its own. Thus, when the user moves from position A to position B, the display device 200 stores the change in the position coordinates and orientation when the display device 200 moves from position A to position B. The position and orientation of the AR object 430" are already set at the same position and in the same attitude as those of the object 400. Accordingly, the user is able to see the AR object 430" sitting at the same position and in the same attitude as those of the object 400 through the display device 200 from position B.

As an example of a conventional technique, there is a mathematical method including extracting a line segment from a captured image of an object, making a pair of a line segment of the model and the extracted line segment of the image, and calculating the position and orientation of the model that allows the pair of the line segments to be superposed in the view. In this method, the model which the calculated position and orientation of the model is applied to and the image are displayed being superposed with each other. In the case where an image and the model are displayed being superposed with each other, using this method, when the user views the object image and the model from a position other than the position where the image of the object was captured, the user sees the object image and the model misaligned with each other. This is because the image and the model are displayed simply being superposed with each other, and they are just associated with each other in a plane. For this reason, when the user views the object and the model from a different position, the user has to capture an image of the object from the direction of the different position and perform a process to superpose the image and the model with each other. Compared to this method, the use of the display device 200 according to this embodiment makes it possible to associate the object and the model with each other accurately. This enables the display device 200 to display an object and the model at various angles without any difference in the positions and attitudes of the object and the model.

In addition, as an example of a conventional technique, there is also a technique using AR markers in which the model is displayed at a relative position from an AR marker to display the model superposed on the object. In this method, the positional relationship between the object and the AR marker is very important. However, in the case where the position of the object is changed after the position between the object and an AR marker is once adjusted, the position of the AR marker also has to be adjusted. In this method, the AR marker is moved manually. Thus, the adjustment of the AR marker along with the change in the position of the object is very troublesome. Compared to this method, the use of the display device 200 according to this embodiment makes it possible to associate the object and the model with each other accurately. This enables the display device 200 to display an object and the model at various angles without any difference in the positions and attitudes of the object and the model.

As an example of a conventional technique, there is also a technique in which the position of the model is set using a predicted value of the user, the position of the model is adjusted by changing the predicted value based on the result of visually observing the degree of agreement of the setting result between the model and the object, to display the model and the object superposed with each other. However, since six axes (axes (x, y, z) for position and axes (α, β, γ) for rotation) have to be controlled to adjust the position of the model, it takes much time to determine the attitude, and also the accuracy in the positioning is low. Compared to this method, the use of the display device 200 according to this embodiment makes it possible to associate the object and the model with each other accurately. This enables the display device 200 to display an object and the model at various angles without any difference in the positions and attitudes of the object and the model.

As above, the use of the display device 200 according to this embodiment makes it possible to superpose the object and the model with each other more accurately than any of the conventional techniques, reducing time to be taken because it does not involve manual work. In addition, since the display device 200 superposes the object and the model with each other, it is possible to display the object and the model at various angles without any difference in the positions and attitudes of the object and the model.

FIGS. 4A and 4B are flowcharts for explaining an example of the process of estimating the setup position of the model in the display device according to this embodiment.

In the process of estimating the setup position of the model, the image capture section 210 captures an image of the object 400 (FIG. 2A) (step S101). The coordinate-attitude detection section 213 detects the position coordinates ($x_{camera}$, $y_{camera}$, $z_{camera}$) and orientation ($\alpha_{camera}$, $\beta_{camera}$, $\gamma_{camera}$) of its own in the world coordinate system at the time of capturing the image of the object 400 (step S102). The storage section 230 stores the position coordinates ($x_{camera}$, $y_{camera}$, $z_{camera}$) and orientation ($\alpha_{camera}$, $\beta_{camera}$, $\gamma_{camera}$) of its own in the world coordinate system at the time of capturing the image of the object 400 (step S103).

The image-feature-line extraction section 215 reads the image data 231 stored in the storage section 230 and extracts feature lines of the object 400 from the image corresponding to the image data 231 (step S104). The model-feature-line extraction section 216 reads the model data 233 from the storage section 230 and extracts feature lines of the object 400 from the AR object 430 corresponding to the model data 233 (step S105).

The rendering processing section 217 renders the feature lines extracted from each of the captured image 420 and the AR object 430 (step S106). At the pairing process, the input section 219 receives information on the pairs of the feature lines extracted from the captured image 420 and the feature lines extracted from the AR object 430 through the user's operation on the controller (step S107). The movement-rotation-matrix calculation section 220 calculates a movement-rotation matrix from the pairs inputted from the input section 219 (step S108).

The positional relationship is determined in which the captured image and the AR object viewed from the image capturing position in the virtual world agree with each other (step S109).

The real-coordinate estimation section 222 sets the position of the AR object such that the determined positional relationship between the virtual-image capturing position and the AR object agrees with the positional relationship between the object and the camera at the time when the image of the object was really captured (step S110). The rendering processing section 217 displays the AR object 430" superposed on the object 400 in the display section 218 (step S111).

As described above, the display device 200 according to this embodiment determines the image capturing position at which the captured image obtained when an image of a model generated based on the structure data of an object is captured from the image capturing position in the virtual world satisfies a specified correspondence relationship with the obtained captured image. After that, based on the acquired image capturing position and the determined positional relationship between the model and the image capturing position in the virtual world, the display device 200 estimates the position of the model in the space. Thus, the use of this embodiment enables the display device 200 to bring the position of the object and the position of the model in the space into agreement with each other accurately. Here, the accuracy in agreement between the positions of the object and the model, obtained by using the display device 200 is higher than in the case where the image and the model are simply superposed and in the case where the image and the model are displayed based on the user's predicted value. In addition, since the display device 200 is capable of measuring its own position coordinates, orientation, and the like; when the user views the model from a different position or at a different angle, the display device 200 is able to display the object and the model without any difference in the positions and attitudes of the object and the model.

<Method of Superposition>

Figure 5:
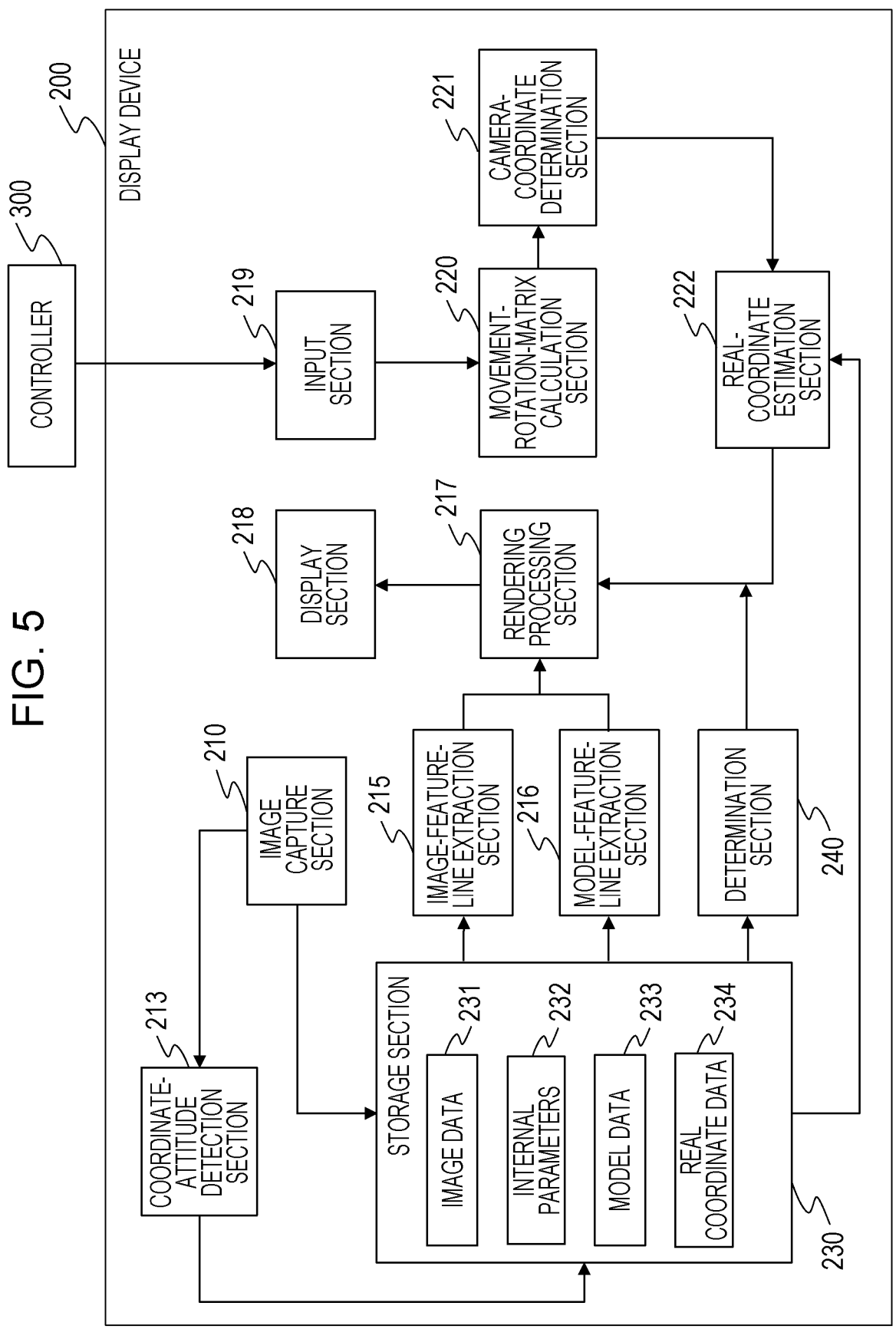
FIG. 5 is a block diagram for explaining an example of a process of displaying the model and object superposed with each other.

FIG. 5 is a block diagram for explaining an example of a process of displaying the model and object superposed with each other. In the case where the display device 200 displays the model superposed on the object without making the model transparent, the user is not able to see the object because the object is hidden by the model. On the other hand, in the case where the display device 200 displays the model superposed on the object making the model transparent, the user sees internal structures of the object in the model which are supposed to be hidden by the surfaces of the object and thus be invisible intrinsically. Thus, the rendering processing section 217 according to this embodiment displays the internal structures in the model which are at positions where they are invisible intrinsically from the position of the user such that the internal structures have higher transparency than the surfaces of the model corresponding to the surfaces of the object. This allows the user not to see the internal structures of the object in the model, which are invisible intrinsically, and makes it easy for the user to judge the difference between the object and the model.

The display device 200 in FIG. 5 further includes a determination section 240 in addition to the one in FIG. 1. The determination section 240, for example, executes a process before the process executed by the rendering processing section 217 at step S111 (FIG. 4B). Note that in the display device 200 in FIG. 5, the same constituents as those in FIG. 1 are denoted by the same numbers.

When the real-coordinate estimation section 222 estimates the position where to display the model in the real coordinates (the world coordinate system), the real-coordinate estimation section 222 sends to the rendering processing section 217, an instruction to display the model of the object viewed from a specified direction. However, since there is no difference at this point in the transparency of the internal structures and the surface structures of the model, the user is able to see the internal structures of the model. For this reason, the rendering processing section 217 tells the determination section 240 to execute a process to determine the locations of parts of the model (the internal structures or the surfaces). Then, the determination section 240 refers to the storage section 230 storing the structure data of the object to read the model data 233. The determination section 240 determines the first parts which are the internal structures of the model and the second parts which are the surface portions of the model. The process of the determination section 240 is described later in detail with reference to FIG. 6.

The determination section 240 sends information on the determined first parts and second parts of the model to the rendering processing section 217. The rendering processing section 217 displays the regions corresponding to the first parts of the model at a first transparency rate and renders the regions corresponding to the second parts of the model using a second transparency rate which is lower than the first transparency rate. The display section 218 displays the object and the model superposed with each other based on the process of the rendering processing section 217.

By displaying the model superposed with the first parts (the internal structures) and the other second parts having different transparency rates as above, the display device 200 according to this embodiment is able to display the object and model superposed with each other without displaying semitransparent internal structures of the model.

Figure 6:
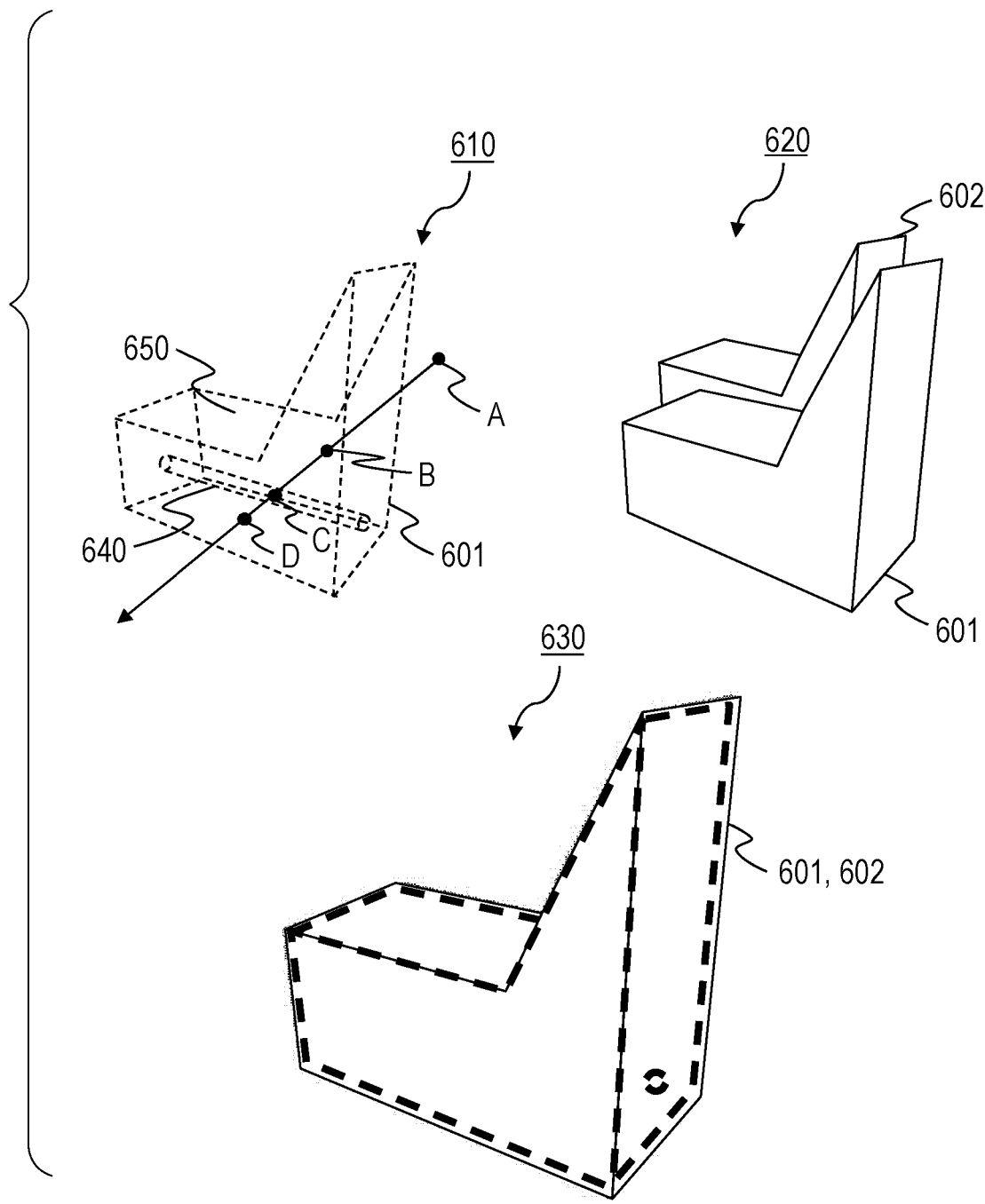
FIG. 6 is a diagram for explaining an example of displaying the model and the object in a display section.

FIG. 6 is a diagram for explaining an example of displaying the model and the object in the display section. Display example 610 is a display example of performing a transparency process on a model 601. If the transparency process is performed on the model 601 as in the figure, there is a problem that a first part 640, which is an internal structure of the model 601, is visible.

Here, description is provided for a process performed by the determination section 240 to determine the first part 640 and a second part 650. Assuming the case of viewing the model of the model 601 from a view point A (the position of the camera), a line is drawn from view point A to each part of the model 601. Then, the line intersects the model of the model 601 at point B, point C, and point D. From these points B to D, the determination section 240 determines the first part which is the internal structure of the model and the second part which is the surface portion of the model. For example, the determination section 240 determines the surface including a point closest to view point A among points B to D to be a second part. In the display example 610, the surface including point B may be determined to be a second part. In the actual process, the same process is performed from various directions. From this result, the determination section 240 determines point C to be a first part 640 which is an internal structure.

The rendering processing section 217 according to this embodiment performs a shading process on the model 601 as in display example 620. Note that as a preliminary process prior to the shading process, the determination section 240 refers to the model data 233 of an object 602 in the storage section 230 and determines first parts 640 (internal structures) which are hidden by other parts when the object 602 is viewed from a specified direction and second parts 650 that are other than the first parts 640. After that, the rendering processing section 217 performs a process to shade the second parts. This process makes the first parts 640 of the model 601 (the internal structures) invisible. However, just performing the shading process on the model 601 makes the object 602 hidden completely by the model 601 as in display example 620.

Thus, after performing the shading process on the model 601, the rendering processing section 217 according to this embodiment performs a transparency process. For example, the rendering processing section 217 displays the region corresponding to the first parts 640 of the model 601 at the first transparency rate, and renders the region corresponding to the second parts 650 of the model 601, using the second transparency rate lower than the first transparency rate. Display example 630 illustrates an example of the model 601 and the object 602 in the case where the transparency process is performed after the shading process is performed on the model 601. Performing the transparency process after the shading process as above makes it possible to display the model 601 superposed on the object 602 with the first parts (the internal structures) hidden.

Figure 7:
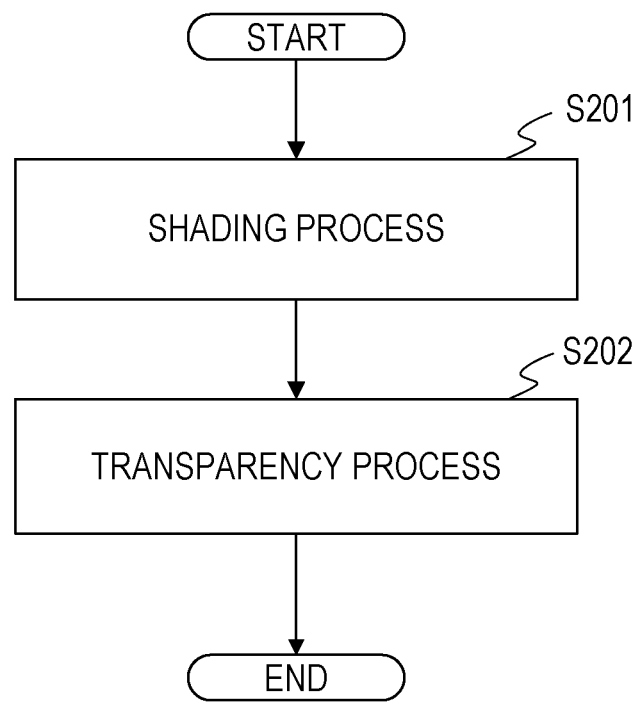
FIG. 7 is a flowchart for explaining an example of a process performed by a rendering processing section.

FIG. 7 is a flowchart for explaining an example of a process performed by the rendering processing section. The rendering processing section 217 executes the following process in the process at step S111 (FIG. 4B).

The rendering processing section 217 executes the shading process when rendering the model 601 (step S201). The rendering processing section 217 executes the transparency process on the model 601 subjected to the shading process (step S202).

By executing the shading process and the transparency process such that the first parts (the internal structures) and the other second parts of the model 601 are displayed at different transparency rates as above, the display device 200 according to this embodiment is able to display the object 602 and the model 601 superposed with each other without displaying semitransparent internal structures of the model 601.

Figure 8:
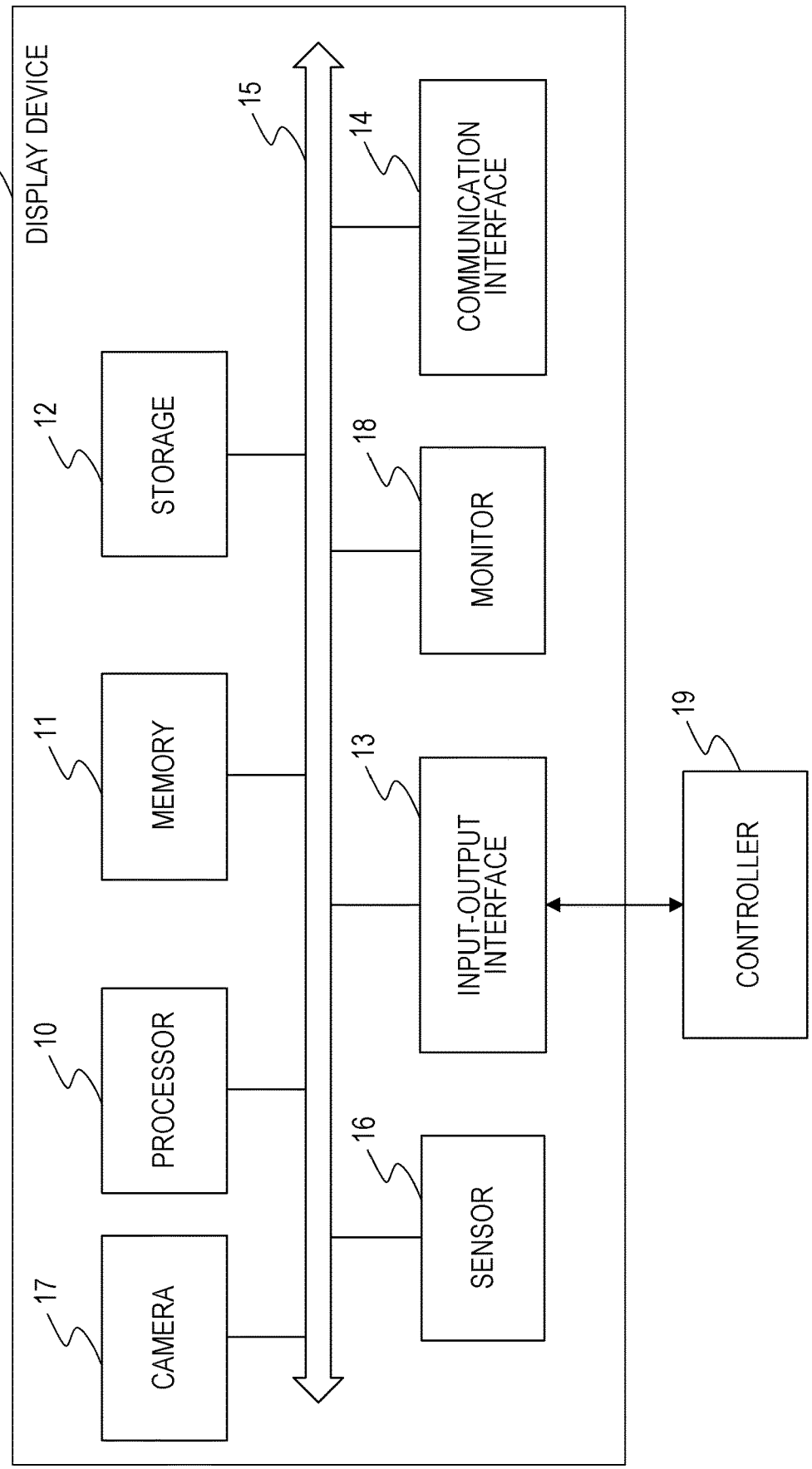
FIG. 8 is a diagram for explaining an example of a hardware configuration of the display device according to this embodiment.

FIG. 8 is a diagram for explaining an example of a hardware configuration of the display device according to this embodiment. The display device 200 includes, as main constituents, a processor 10, memory 11, storage 12, input-output interface 13, communication interface 14, sensor 16, camera 17, and monitor 18. Each constituent is connected to a bus 15. The display device 200 is implemented as an information processing apparatus.

The processor 10 executes a series of commands included in a program stored in the memory 11 or the storage 12 based on signals given to the display device 200 or based on predetermined conditions being satisfied. The processor 10 is implemented as a central processing unit (CPU), a microprocessor unit (MPU), a field-programmable gate array (FPGA), or another device. The processor 10 provides the functions of the image-feature-line extraction section 215, model-feature-line extraction section 216, rendering processing section 217, movement-rotation-matrix calculation section 220, camera-coordinate determination section 221, real-coordinate estimation section 222, and determination section 240 of the display device 200 according to this embodiment.

The memory 11 temporarily stores programs and data. The programs are, for example, loaded from the storage 12. The data includes data inputted into the display device 200 and data generated by the processor 10. The memory 11 is implemented as a random access memory (RAM) or another volatile memory.

The storage 12 permanently stores the programs and the data. The storage 12 is implemented as, for example, a read-only memory (ROM), a hard disk drive, a flash memory, or another nonvolatile storage apparatus. The programs stored in the storage 12 include a program for providing a virtual space in the display device 200, a simulation program, and a program for implementing communication with other computers. The data stored in the storage 12 includes data and objects for defining the virtual space. The storage 12 operates as the storage section 230 of the display device 200.

The storage 12 may be implemented as a detachable storage apparatus, such as a memory card. Further, instead of the storage 12 integrated in the display device 200, programs and data stored in external storage apparatuses may be used.

The input-output interface 13 receives input of operation information from a controller 19. The controller 19 operates as the controller 300 in FIG. 2B. The input-output interface 13 operates as the input section 219. The input-output interface 13 is implemented using a terminal of a Universal Serial Bus (USB) interface, Digital Visual Interface (DVI), High-Definition Multimedia Interface (HDMI (registered trademark), or another interface. Note that the input-output interface 13 is not limited to those listed above.

The communication interface 14 is connected to a network and communicates with other computers connected to the network. The communication interface 14 is implemented, for example, as a wired communication interface, such as a local area network (LAN), or as a wireless communication interface, such as wireless fidelity (WiFi), Bluetooth (registered trademark), or Near Field Communication (NFC). Note that the communication interface 14 is not limited to those listed above.

In the display device 200, the world coordinate system is set in advance. The world coordinate system has three reference directions (axes) that are, respectively, in parallel with the vertical direction in the real space, a horizontal direction orthogonal to the vertical direction, and the front-rear direction orthogonal to both the vertical direction and the horizontal direction. In this embodiment, the world coordinate system is one of viewing coordinate systems. Here, the horizontal direction, vertical direction (up-down direction), and front-rear direction in the world coordinate system are respectively defined as the x axis, y axis, and z axis. For example, in the world coordinate system, the x axis is in parallel with the horizontal direction of the real space. The y axis is in parallel with the vertical direction of the real space. The z axis is in parallel with the front-rear direction of the real space.

The sensor 16 detects the position and inclination of the display device 200 in the real space, corresponding to the motion of the user who wears the display device 200, based on the values of each point (coordinate values in the world coordinate system). For example, the sensor 16 is capable of detecting temporal change in the position and inclination of the display device 200 using values detected over time. The sensor 16 operates as the coordinate-attitude detection section 213.

The monitor 18, disposed in the body of the display device 200 to be located in front of both eyes of the user, is implemented as, for example, a non-transmissive display apparatus. Thus, the user is able to immerse himself/herself in the virtual space, viewing three-dimensional images displayed on the monitor 18. In an embodiment, the virtual space includes, for example, images of the background, an object operable by the user, and a menu selectable by the user. In an embodiment, the monitor 18 may be implemented as a liquid crystal monitor or organic electro luminescence (EL) monitor included in an information display terminal such as what is called a smartphone. The monitor 18 operates as the display section 218.

The camera 17 is disposed in the body of the display device 200 so as to capture an image in the line-of-sight direction of the user's eyes. An image or a video captured by the camera 17 is displayed on the monitor 18. The camera 17 operates as the image capture section 210.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a determination program for causing a computer to execute a process comprising:
    acquiring a captured image obtained by capturing an image of an object existing in a space and an image capturing position where the image was captured;
    determining a virtual-image capturing position, a virtually captured image, obtained when an image of a model generated based on structure data of the object is captured from the virtual-image capturing position, satisfying a specified correspondence relationship with the captured image having been obtained; and
    determining a position in the space with which the model is associated, based on the acquired image capturing position and positional relationship between the model and the virtual-image capturing position.

2. The recording medium according to claim 1, wherein the specified correspondence relationship is positional relationship that makes degree of agreement satisfy a criterion, the degree of agreement being degree to which the virtually captured image viewed from the virtual-image capturing position and an image of the object included in the captured image obtained from the acquisition agree with each other.

3. The recording medium according to claim 1, wherein in the determining the position in the space with which the model is associated,
    the position of the model in the space is determined such that the positional relationship between the model and the virtual-image capturing position corresponds to positional relationship between the object and the image capturing position.

4. The recording medium according to claim 1, wherein the structure data is design data created in advance when the object is designed, and
    the model is a three-dimensional model based on the structure data.

5. An information processing apparatus for determining a position of a model, the apparatus comprising:
    a memory, and
    a processor coupled to the memory and configured to:

acquire a captured image obtained by capturing an image of an object existing in a space and an image capturing position where the image was captured;

determine a virtual-image capturing position, a virtually captured image, obtained when an image of a model generated based on structure data of the object is captured from the virtual-image capturing position, satisfying a specified correspondence relationship with the captured image having been obtained; and determine a position in the space with which the model is associated, based on the acquired image capturing position and positional relationship between the model and the virtual-image capturing position.

6. A determination method performed by a computer for determining a position of a model, the method comprising:

acquiring a captured image obtained by capturing an image of an object existing in a space and an image capturing position where the image was captured;

determining a virtual-image capturing position, a virtually captured image, obtained when an image of a model generated based on structure data of the object is captured from the virtual-image capturing position, satisfying a specified correspondence relationship with the captured image having been obtained; and determining a position in the space with which the model is associated, based on the acquired image capturing position and positional relationship between the model and the virtual-image capturing position.

7. The recording medium according to claim 1, the process further comprising:

receiving a designation of a specific direction from which the model of the object to be displayed is viewed;

determining, among parts included in the object, a first part hidden by another part when the object is viewed from the designated direction and a second part different from the first part, by referring to a storage that stores the structure data of the object; and displaying a region in the model corresponding to the determined first part at a first transparency rate and displaying a region in the model corresponding to the determined second part at a second transparency rate which is lower than the first transparency rate.

8. The information processing apparatus according to claim 5, the processor is further configured to:

receive a designation of a specific direction from which the model of the object to be displayed is viewed;

determine, among parts included in the object, a first part hidden by another part when the object is viewed from the designated direction and a second part different from the first part, by referring to a storage that stores the structure data of the object; and display a region in the model corresponding to the determined first part at a first transparency rate and displaying a region in the model corresponding to the determined second part at a second transparency rate which is lower than the first transparency rate.

9. The determination method according to claim 6 further comprising:

receiving a designation of a specific direction from which the model of the object to be displayed is viewed;

determining, among parts included in the object, a first part hidden by another part when the object is viewed from the designated direction and a second part different from the first part, by referring to a storage that stores the structure data of the object; and displaying a region in the model corresponding to the determined first part at a first transparency rate and displaying a region in the model corresponding to the determined second part at a second transparency rate which is lower than the first transparency rate.

* * * * *